Patented Nov. 3, 1931

1,829,828

UNITED STATES PATENT OFFICE

NORMAN H. GAY, OF LOS ANGELES, CALIFORNIA

VALVE FLOAT FOR REFRIGERATING SYSTEMS

Application filed February 27, 1930. Serial No. 431,850.

The present invention relates to improvements in valve floats for refrigerating systems, and particularly proposes a float construction which automatically maintains itself clear of condensed liquid.

A feature of the present invention is the provision of a float having free access for gas into its interior, but so constructed and arranged that any condensed liquid within the float is evacuated from the same during the cycle of operation of the refrigerating system in which the float is placed.

Another feature of the invention is the provision of a very cheap and simply constructed float which is not subject to collapsing or bursting during the phases of operation.

With these and other objects in view as will appear in the course of the following specification and claims, an illustrative form of the invention is set forth on the accompanying drawings, in which:

Figure 1:
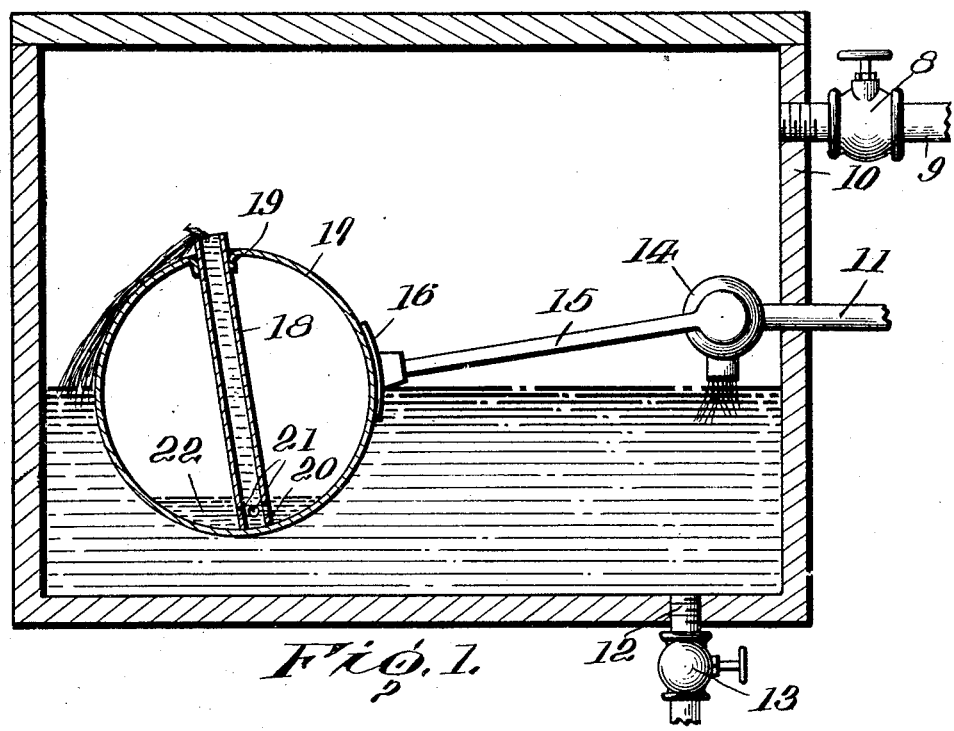
Figure 1 is a vertical sectional view through the valve or trap chamber and through the float, with the float in lowered position.

According to this invention a refrigerating system having a receiver or chamber for liquid refrigerant is to be provided with a float valve which, in the instance illustrated, controls the liquid level in the chamber by regulating the quantity of fluid delivered into the chamber, but may also be employed for controlling the liquid level by regulating the quantity of liquid delivered from the chamber. This fluid enters the chamber usually in liquid form and, while the valve is open, tends to raise the liquid level within the chamber. Ultimately the float is brought into such a position that it closes the valve and this delivery of the fluid is shut off. Liquid is continuously or intermittently withdrawn from this receiver with the result of lowering the liquid level and the float until the valve is again opened for the delivery of further fluid into the receiver. This cycle of operation continues for many days during the course of operation of the refrigerating machinery: and it is essential that the float should at all times respond accurately and definitely to the liquid level in the receiver.

Due to varying pressures in the refrigeration system the pressure in the chamber containing the float varies. As the pressure rises above the internal pressure of the float, the pressure upon the outer walls of a closed float tends to cause a collapsing or distortion of the float. On the other hand, if the float be closed, a drop in external pressure below the internal pressure of the float may cause a bursting of the ball: and hence a closed ball must be of heavier material and hence larger for the required buoyancy. Further, any leak or aperture in the float wall will permit the entry of gas which may be condensed into a liquid inside the float during the high pressure portion of the cycle of operation, and thus weighting the float so that it no longer rises to the proper height in response to a change in the liquid level, and ultimately the float becomes so liquid-logged that it holds the valve substantially in a continuously open position, in the illustrative example.

In the drawings, the receiver 10 is shown as closed except for a fluid inlet pipe 11, a gas equalizing pipe 9 which is illustrated as having a valve 8, and a fluid withdrawal pipe 12 which is illustrated as having a valve 13 (by means of which valves chamber may be separated from the system). In operation valves 8 and 13 remain open and pipes 9 and 12 serve to equalize the liquid levels and pressures with other portions of the refrigerating system. The pipe 11 has a float-operated valve 14 within the receiver, operatively connected to the crank arm 15 which supports a bearing plate or bushing 16 attached to the float 17. This float may be of any appropriate construction, but is here represented as being substantially spherical. A pipe 18 passes downwardly through the float 17 and forms a gas and liquid tight joint 19 therewith at the top of the float, the pipe thus extending substantially diametrically downward through the float and being of sufficient length so that it makes contact with the inner wall of the float at its lower end 20. Adjacent its lower end the pipe 18 is provided with one or more apertures 21.

Figure 2:
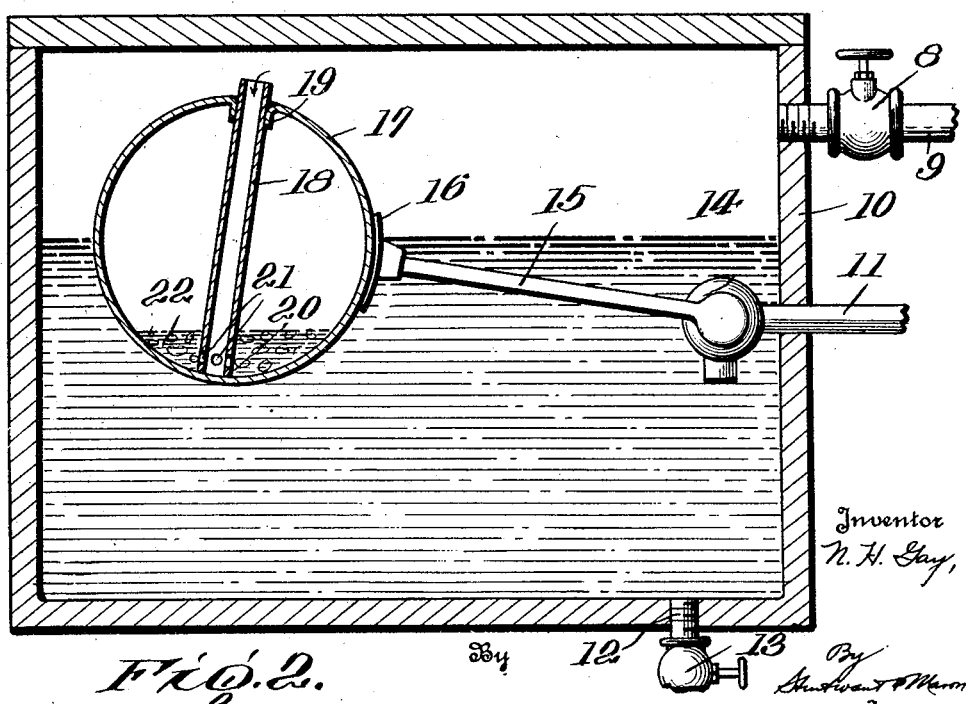
Fig. 2 is a corresponding view with the float in raised position.

In operation, when the float is in the position shown in Fig. 1, the valve 14 permits the delivery of liquid through the pipe 11, whereby to raise the liquid level in the receiver 10. As the liquid level rises, the float ball 17 is raised to the position of Fig. 2 and its crank arm or stem 15 closes the valve 14 so that no further liquid is admitted during this stage of the operation. Liquid may be withdrawn continuously or intermittently through the pipe 12 as the system may require it.

Due to varying pressures in the refrigerating system, pressures in the float chamber 10 vary correspondingly. Since the interior space of the float 17 is in direct communication by the pipe 18 and openings 21 with the upper space of the receiver, when the pressure rises in the float chamber, gas will flow downward in the pipe 18 and into the interior of float 17 until a pressure balance is again established. If the pressure is above a critical point for the temperature involved, there will be actual condensation of some of the refrigerant gas within the float 17 to form a pool of liquid 22 therein. The remaining gas, if the gas pressure within the receiver continues to increase, will bubble upwardly through this forming pool of liquid 22.

On the other hand, when the pressure in the system falls, the gas pressure in the float chamber 10 is correspondingly lowered, so that a further change of equilibrium between the pressure inside and outside of the float 17 occurs and the body of gas within the upper portion of the float 17 now operates upon the surface of the pool of liquid 22 whereby to force this liquid through the aperture 21 and upwardly in the pipe 18 so that it flows out of the open upper end of the pipe and joins the general body of liquid within the receiver 10. This operation may also be materially assisted by the evaporating of some of the liquid in the interior of the float due to falling pressures, thus creating more gas in the float and displacing more liquid. This purging operation is accomplished at each drop in pressure in the controlled portion of the refrigerating system, so long as liquid remains in the pool 22 above the level of the apertures 21: and hence the float is maintained at a predetermined buoyancy.

The pipe 18 is preferably soldered or welded into the upper wall of the float 17 at the point 19 and extends downwardly into contact with the lower wall of the float at its lower end 20, so that it prevents any crushing or collapsing of the float under sudden and rapid changes of pressures.

It has been found in practice that, under relatively fast rising and falling of pressure in the chamber, the float, if made of material fragile enough to give the desired buoyancy, tends to "breathe". If tube 18 were extended to within a short distance of the bottom of the float without the equalizing holes 21, the breathing of the float causes bottom 21 to move upward at times closing the opening at the bottom of the tube when equalization of pressure ceases and the float collapses. This condition occurs even when the end of the tube is beveled, the bottom of the float then distorting itself to conform to the shape of the bevel at the bottom of the tube. By extending the tube to the bottom of the float, the tube acts as a strut to stiffen the float and, by means of holes 21 in the tube, the equalizing feature is made permanent.

Such float control mechanisms may be employed in various ways in the refrigerating and other arts, as pressure reducing or expansion valves, as auxiliaries for hand operated and hand set reducing or expansion valves, and as pilot valves for diaphragm operated pressure reducing valves. The float is peculiarly applicable for usage in maintaining liquid levels in the pressure or condensing portion of refrigerating systems where high pressures exist and a float of low weight and great buoyancy is required. Equalization of pressure permits floats of shapes other than spheres in pressure containers, in which case the "breathing" of the sides of the float may be much more pronounced.

It is obvious that the invention is not limited to the form of construction shown, but that it may be modified in many ways within the scope of the appended claims.

What I claim as new and desire to secure by Letters Patent is:

1. In a float valve structure for a refrigerating plant having a closed receiver with a varying liquid level therein whereby changes of gas pressure occur as well as changes of liquid level, the combination of a valve and a float to control the said valve, said float comprising a hollow member having a downwardly projecting tubular conduit therein extending from the upper side to the opposite inner surface of the float against which it bears, said conduit having an opening to the interior of the member closely adjacent its bottom end and open at its upper end into said receiver, said conduit being fixedly secured in position in the float, thereby providing a stiffening strut within the float.

2. In a float valve structure for a refrigerating plant having a closed receiver with a varying liquid level therein whereby changes of gas pressure occur as well as changes of liquid level, the combination of a valve and a float to control the said valve, including a movable connecting member between said valve and float, said float comprising a hollow member, a tubular conduit extending diametrically within the float from an opening in its upward side to the opposite inner surface thereof against which it bears, said conduit being hermetically and fixedly secured to the float at said opening and having an opening adjacent its bottom end communicating it with the interior of said float.

In testimony whereof, I affix my signature.

NORMAN H. GAY.